US012075221B2

(12) United States Patent
Pedersen et al.

(10) Patent No.: US 12,075,221 B2
(45) Date of Patent: *Aug. 27, 2024

(54) AUDIO RENDERING SYSTEM

(71) Applicant: GN Hearing A/S, Ballerup (DK)

(72) Inventors: Thorkild Find Pedersen, Valby (DK); Brian Dam Pedersen, Ringsted (DK)

(73) Assignee: GN HEARING A/S, Ballerup (DK)

( * ) Notice: Subject to any disclaimer, the term of this patent is extended or adjusted under 35 U.S.C. 154(b) by 0 days.

This patent is subject to a terminal disclaimer.

(21) Appl. No.: 18/091,370

(22) Filed: Dec. 30, 2022

(65) Prior Publication Data

US 2023/0145928 A1    May 11, 2023

Related U.S. Application Data

(63) Continuation of application No. 17/143,103, filed on Jan. 6, 2021, now Pat. No. 11,689,852, which is a
(Continued)

(30) Foreign Application Priority Data

Aug. 7, 2018   (DK) .......................... PA 2018 70518
Aug. 15, 2018  (EP) .................................. 18189208

(51) Int. Cl.
*H04R 3/12*        (2006.01)
*G06F 12/0815*    (2016.01)
*H04R 27/00*       (2006.01)

(52) U.S. Cl.
CPC ........... *H04R 3/12* (2013.01); *G06F 12/0815* (2013.01); *H04R 27/00* (2013.01);
(Continued)

(58) Field of Classification Search
CPC .... H04R 3/12; H04R 27/00; H04R 2227/003; H04R 2420/07; H04R 25/552;
(Continued)

(56) References Cited

U.S. PATENT DOCUMENTS 9,712,266 B2 *  7/2017  Linde ..................... H04W 4/80
9,742,471 B1    8/2017  Thoen
(Continued)

FOREIGN PATENT DOCUMENTS

CN    101263735      9/2008
EP    2897384 A2    7/2015
(Continued)

OTHER PUBLICATIONS

Extended European Search Report dated Nov. 2, 2018 for corresponding European Patent Application No. 18189208.4.
(Continued)

*Primary Examiner* — Carolyn R Edwards
*Assistant Examiner* — Friedrich Fahnert
(74) *Attorney, Agent, or Firm* — Vista IP Law Group, LLP

(57) ABSTRACT

An audio rendering device includes: at least one wireless communications interface configured to receive a first plurality of audio packets from a wireless communication device, the first plurality of audio packets including frames of audio data for a first audio channel from a set of one or more audio channels; and a processing unit; wherein the audio rendering device is configured to release, at respective first buffer release times, the frames of the audio data for the first audio channel from a first buffer for rendering by the processing unit; wherein the audio rendering device is configured to receive one or more messages from an other audio rendering device; and wherein the audio rendering device is configured to synchronize the first buffer release times with second buffer release times associated with the other audio rendering device based on the received one or more messages.

27 Claims, 5 Drawing Sheets

Related U.S. Application Data continuation of application No. 16/450,545, filed on Jun. 24, 2019, now Pat. No. 10,904,666.

(52) U.S. Cl.
CPC .. *G06F 2212/171* (2013.01); *H04R 2227/003* (2013.01); *H04R 2420/07* (2013.01)

(58) Field of Classification Search
CPC ............... H04R 25/554; G06F 12/0815; G06F 2212/171; G06F 3/162; H04W 4/80; H04M 1/6066; G11B 20/10527; G11B 2020/10694; G11B 2020/10935
USPC .......................................................... 381/80
See application file for complete search history.

(56) References Cited

U.S. PATENT DOCUMENTS

| | | | |
|---|---|---|---|
| 9,788,117 B2* | 10/2017 | Watson | ................... H04R 3/12 |
| 10,356,527 B2 | 7/2019 | Tanaka et al. | |
| 2007/0086601 A1 | 4/2007 | Mitchler | |
| 2008/0226103 A1 | 9/2008 | Schobben | |
| 2009/0238375 A1 | 9/2009 | Pilati et al. | |
| 2009/0298420 A1* | 12/2009 | Haartsen | ............... H04J 3/0658 |
| | | | 455/3.06 |
| 2012/0058727 A1* | 3/2012 | Cook | ....................... H04R 3/12 |
| | | | 455/41.3 |
| 2012/0121095 A1* | 5/2012 | Popovski | ............ H04R 25/552 |
| | | | 381/23.1 |
| 2013/0060363 A1 | 3/2013 | Warren | |
| 2013/0266152 A1* | 10/2013 | Haynie | .................. H04R 5/033 |
| | | | 381/80 |
| 2014/0348327 A1 | 11/2014 | Linde et al. | |
| 2016/0098244 A1* | 4/2016 | Hsieh | ...................... G06F 3/165 |
| | | | 700/94 |
| 2017/0055089 A1 | 2/2017 | Pedersen et al. | |
| 2017/0105076 A1 | 4/2017 | Gehring et al. | |
| 2017/0195769 A1 | 7/2017 | Chang et al. | |
| 2017/0277507 A1 | 9/2017 | Ando et al. | |
| 2018/0006752 A1 | 1/2018 | Gehring et al. | |
| 2018/0184234 A1 | 6/2018 | Chen et al. | |
| 2019/0124442 A1* | 4/2019 | Hanes | ................... H04R 3/005 |
| 2019/0274109 A1 | 9/2019 | Knowles et al. | |
| 2019/0349682 A1* | 11/2019 | Hsu | ......................... H04W 4/80 |
| 2019/0387320 A1 | 12/2019 | Sakai | |

FOREIGN PATENT DOCUMENTS

| | | |
|---|---|---|
| EP | 2897384 A3 | 8/2015 |
| EP | 3116239 A1 | 1/2017 |

OTHER PUBLICATIONS

Non-Final Office Action for U.S. Appl. No. 16/450,545 dated Apr. 2, 2020.

Notice of Allowance for U.S. Appl. No. 16/450,545 dated Sep. 14, 2020.

Rothermel, K., et al., "An Adaptive Stream Synchronization Protocol," 5$^{th}$ International Workshop, NOSSDAV, Apr. 1995.

Extended European Search Report for EP Patent Appln. No. 18189208.4 dated Nov. 2, 2018.

Extended European Search Report for EP Patent Appln. No. 21172984.3 dated Jul. 27, 2021.

Non-Final Office Action for U.S. Appl. No. 17/143,103 dated Apr. 20, 2022.

Notice of Allowance for U.S. Appl. No. 17/143,103 dated Sep. 29, 2022.

Foreign OA for CN Patent Appln. No. 201910660506.8 dated Sep. 2, 2023.

\* cited by examiner

AUDIO RENDERING SYSTEM

RELATED APPLICATION ATA

This application is a continuation of U.S. patent application Ser. No. 17/143,103 filed on Jan. 6, 2021, pending, which is a continuation of U.S. patent application Ser. No. 16/450,545, filed on Jun. 24, 2019, now U.S. Pat. No. 10,904,666, which claims priority to, and the benefit of, Danish Patent Application No. PA 2018 70518 filed on Aug. 7, 2018, and European Patent Application No. 18189208.4 filed on Aug. 15, 2018. The entire disclosures of the above applications are expressly incorporated by reference herein.

FIELD

The present disclosure relates to an audio rendering system comprising a wireless communications device, a first audio rendering device and a second audio rendering device. In particular, the present disclosure relates to such a system wherein the wireless communications device is configured to transmit a first plurality of audio packets to the first audio rendering device and a second plurality of audio packets to the second audio rendering device, the first plurality of audio packets including audio data for a first audio channel from a set of one or more audio channels and the second plurality of audio packets including audio data for a second audio channel from said set of one or more audio channels. The present disclosure relates to further aspects related to such a system.

BACKGROUND

Wireless streaming of audio data by a pair of audio rendering devices from a wireless communications device is highly desirable. There exist, however, a number of technical problems in terms of power consumption, reliability, transmission latency and/or delay, component size etc. with prior art wireless data communication methodologies, protocols and devices that must be addressed to deliver a feasible solution for an audio rendering device. These challenges are particularly pronounced when the audio rendering device has a small form factor and/or only a small amount of power available. In particular, this is the case when the pair of audio rendering devices form a pair of hearing instruments.

Standardized wireless data communication protocols such as Bluetooth LE (BLE) as defined by the Bluetooth Core Specification 5.0, or earlier versions, does not allow for real-time audio transport.

The lack of real-time transport means also means that stereo synchronization between two paired audio sinks (such as hearing aids) is difficult to achieve.

U.S. Pat. No. 9,712,266 discloses techniques for synchronizing rendering of multi-channel audio output where the wireless communications device wirelessly transmits an indication to one of the audio rendering devices to delay rendering audio data by a certain length of time.

However, this solution requires modification of the wireless communications device. Therefore it may be desirable to provide a system that does not require specific modifications or configuration of the wireless communications device. In particular it may be desirable to provide a system that allows use of an existing wireless communications device as part of the system and/or that provides larger flexibility as to the choice of wireless communications device.

It is generally desirable to overcome one or more of the above-mentioned problems and shortcomings of the prior art wireless data communication methodologies, protocols and devices and or to provide an alternative thereto.

SUMMARY

According to a first aspect, disclosed herein are embodiments of an audio rendering system; comprising a wireless communications device, a first audio rendering device and a second audio rendering device. The wireless communications device is configured to transmit a first plurality of audio packets to the first audio rendering device and to transmit a second plurality of audio packets to the second audio rendering device, the first plurality of audio packets including frames of audio data for a first audio channel from a set of one or more audio channels and the second plurality of audio packets including frames of audio data for a second audio channel from said set of one or more audio channels. The first audio rendering device is configured to maintain a first buffer of received frames of audio data for the first audio channel and to release, at respective first buffer release times, frames of audio data for the first audio channel from said first buffer for rendering. The second audio rendering device is configured to maintain a second buffer of received frames of audio data for the second audio channel and to release, at respective second buffer release times, frames of audio data for the second audio channel from said second buffer for rendering. The first audio rendering device is configured to receive one or more messages from the second audio rendering device. Moreover, at least the first audio rendering device is configured to synchronise the first buffer release times with the second buffer release times based on the received one or more messages.

Accordingly, by introducing respective buffers at the first and second audio rendering devices and by synchronising, based on communication between the first and second audio rendering device, release times for releasing frames from the buffers, an efficient system for rendering audio content on two devices in a synchronised manner is provided.

As the synchronisation is based on communication between the audio rendering devices, the synchronisation is not dependent on specific synchronisation information from the wireless communications device. Accordingly, the wireless communication device does not need to be capable of providing such information.

Moreover, the provision of respective buffers at the audio rendering devices and by synchronising buffer release times, the synchronised rendering is robust against unreliable communication between the wireless communications device and the respective audio rendering devices. In particular, the system may account for failures in audio packet transmission on the individual communications channels while maintaining synchronised audio rendering at least to a large degree.

The audio data may be for stereo audio output that includes a plurality of stereo audio channels. The first and second audio channels may thus be different audio channels, e.g. a left and right stereo audio channel, respectively. In some embodiments the first and second audio channels may be the same channel which is intended for synchronised rendering via multiple audio rendering devices.

The audio data may comprise a plurality of samples or values of a digital audio signal, such as a sequence of discrete-time and discrete-amplitude digital audio signal values that represent continuous-time and continuous-amplitude values of an analogue audio signal that can be converted into acoustic sound. The audio samples or values may be arranged in frames of fixed or variable length. The audio data may be encoded audio data, i.e. the audio data may be received in encoded form. In other words, the audio data and frames may contain encoded digital data that are intended for conversion into sound by the audio rendering device as is well-known in the art of streaming audio. For the purpose of the present description, the conversion of the audio data into sound is also referred to as rendering. The conversion may include several processing steps, e.g. including a decoding step when the audio data is encoded according to a suitable encoding scheme. Hence, the term audio data is intended to encompass encoded audio data and non-encoded/decoded audio data.

According to some embodiments, the wireless communications channel between the wireless communications device and each of the audio rendering devices and/or the communications channel between the first and second audio rendering devices may utilise radio-frequency communication, e.g. using one or more frequency bands located in the industrial scientific medical (ISM) radio frequency range such as in the 2.40-2.50 GHz band or the 902-928 MHz band. The wireless communication may alternatively use another suitable frequency band. In some embodiments, the wireless communications between the wireless communications device and each of the audio rendering devices and the wireless communications between the first and second audio rendering devices may utilise the same frequency band or respective frequency bands.

The wireless communications device may be configured to transmit the first plurality of audio packets to the first audio rendering device via a first wireless communications link between the wireless communications device and the first audio rendering device, in particular via a direct wireless communications link, or otherwise via a wireless communications link not involving the second audio rendering device. The wireless communications device may be configured to operate as a master device and the first audio rendering device may be configured to operate as a first slave device when communicating data between the wireless communications device and the first audio rendering device, e.g. under an audio-enabled Bluetooth LE protocol or under another suitable communications protocol for communicating audio data.

Similarly, the wireless communications device may be configured to transmit the second plurality of audio packets to the second audio rendering device via a second wireless communications link between the wireless communications device and the second audio rendering device, in particular via a direct wireless communications link, or otherwise via a wireless communications link not involving the first audio rendering device. The wireless communications device may be configured to operate as a master device and the second audio rendering device may be configured to operate as a second slave device when communicating data between the wireless communications device and the second audio rendering device, e.g. under an audio-enabled Bluetooth LE protocol or under another suitable communications protocol for communicating audio data.

In some embodiments, each of the audio rendering devices may comprise one or more hardware components that implement the communication with the wireless communications device as well as the communication with the other audio rendering device. This may be particularly feasible and advantageous when the wireless communications between the wireless communications device and the respective audio rendering devices uses the same general communications technology as the wireless communication between the first audio rendering device and the second audio rendering device. In particular, the respective communications channels may use RF communication using the same or similar frequency bands and/or sharing the same or similar implementations of at least some layers of the communications stack, e.g. the lowest one or more layers of the communications stack. For example, the audio rendering device may include a single antenna and/or a single transceiver and/or the same communications controller, thus allowing the audio rendering device to maintain a small form factor.

In some embodiments, the wireless communications device may communicate the audio packets to the respective audio rendering devices using Bluetooth communication, such as Bluetooth LE communication.

In some embodiments, the wireless communications channel between the first and second audio rendering devices may be based on near-field magnetic coupling between inductive coils of the first and second audio rendering devices. In the latter embodiment, the plurality of spaced apart frequency bands may be arranged in a radio frequency range below 2 GHZ, for example below 1 GHZ, or below 500 MHz.

The communication between the first and second audio rendering devices may be unidirectional or bidirectional. The communication may be wireless, e.g. using radio-frequency communication, inductive communication or the like. The communications may be direct or indirect. The communication may be in the form of data packets. The communication may convey messages including control data. In particular, the messages exchanged between the first and second audio rendering devices on which synchronisation is performed as described herein may lack audio data. The messages may thus solely include one or more types of control data for the aligning or synchronization of the operation of the first and second audio rendering devices as discussed in further detail herein. Alternatively, at least some of the data communicated between the first and second audio rendering devices may comprise audio data and/or control data used for purposes other than synchronizing the rendering of audio channels. The communications between the first and second audio rendering devices may be via a communications link separate and distinct from the first communications links used for communicating the first plurality of audio packets from the wireless communications device to the first audio rendering device and separate and distinct from the second communications links used for communicating the second plurality of audio packets from the wireless communications device to the second audio rendering device. Accordingly, neither the first nor second plurality of audio packets need to be communicated between the first and second audio rendering devices.

The first and second audio rendering devices may maintain a communication link with each other over an extended period of time. Alternatively, they may intermittently establish communications links during each of a plurality of successive connection events while being communicatively disconnected during intervening idle time periods. Hence, the plurality of consecutive connection events may be separated by intervening disconnect or idle time periods without data exchange between the first and second audio rendering devices. Hence, each pair of successive connection events may be separated by a disconnect period or idle time period. Similarly, even when the first and second audio rendering devices maintain a communication link, the first and second audio rendering devices may communicate data over the communications link at successive communication events separated by idle times. The time separation, or transmission interval, between a pair of adjacent connection or communication events may be between 5 ms and 500 ms such as between 10 ms and 200 ms, such as between 10 ms and 100 ms. The time separation, or transmission interval, may be fixed or vary over time, e.g. responsive to available bandwidth and/or transmission of higher priority data. In some embodiments, at each connection or communication event, a message from one of the audio rendering device to the other audio rendering device is sent without communicating a message in the reverse direction. At a subsequent communication or connection event, a message may be sent in the reverse direction, i.e. such that, at any given communication or connection event, each device either only receives or transmits a message. The sending and receiving roles may then be reversed at alternating connection or communication events. It will be appreciated, however, that other embodiments may use other communications protocols. The messages may be communicated as data packets according to a suitable communications protocol.

The wireless communications device may transmit audio packets to the respective audio rendering devices according to a transmission schedule. In particular, the wireless communication device may transmit audio packets to the first audio rendering device at regularly spaced apart communication events, i.e. the audio packets of the first plurality of audio packets are sent at equal time intervals between subsequent transmissions. Similarly, the wireless communication device may transmit audio packets to the second audio rendering device at regularly spaced apart communication events, i.e. the audio packets of the second plurality of audio packets are sent at equal time intervals between subsequent transmissions. The time intervals between transmissions may be the same for both channels.

The communication between each of the first and second audio rendering devices and the wireless communications device may be bi-directional. In particular, in some embodiments, the first and second audio rendering devices may be configured to transmit respective acknowledgement messages to the wireless communications device responsive to successful receipt of each of the first or second plurality of audio packets. To this end, each of the first and second pluralities of audio packets may comprise suitable data check sections comprising a packet error-detection and/or packet error-correction code. The packet error-detection and/or error-correction code may for example comprise a cyclic redundancy check (CRC) code.

In some embodiments, the wireless communications device may be configured to retransmit audio packets for which the wireless communications device has not received an acknowledgement of successful receipt from the corresponding audio rendering device. In some embodiments, retransmission is carried out until an acknowledgement of successful receipt is received. In some embodiments, however, retransmission is only repeated for a maximum of N times, N being a positive integer. If N retransmissions have been reached, and the wireless communication device has still not received an acknowledgement indicator indicative of a successful receipt of the audio packet by the corresponding audio rendering device, the wireless communications device may proceed to flush, delete or abandon the audio packet since N failed retransmissions have now been carried out or even completely reset the communications link. Alternatively, if the N retransmissions have not been reached, the wireless communications device may make a further retransmission attempt of the audio packet and thereafter proceed to monitor the wireless communication channel awaiting an acknowledgment indicator from the corresponding audio rendering device to which the audio packet has been sent. Generally, upon receipt of an acknowledgement indicator indicative of successful receipt of the audio packet by the audio rendering device to which the audio packet has been sent, the wireless communications device may proceed by transmitting another audio packet according to the transmission schedule. In some embodiments, the wireless communications device may skip one or more subsequent audio packets, and proceed with a later audio packet of the sequence, when transmission of a previous audio packet has been unduly delayed, e.g. due to a high number of retransmissions. For example, if audio packet K was retransmitted multiple times before an acknowledgement of successful receipt has been received, the wireless communication device may proceed by transmitting audio packet K+1+k (k being a positive integer) instead of audio packet K+1.

The flushing of the failed audio packet and/or of a subsequent, not yet transmitted audio packet, allows the wireless communications device to proceed with a more up-to-date or current audio frame. This flushing procedure in respect of lost or delayed audio packets avoids that audio transmission through the wireless communications channel is blocked or hung by a large number, in principle an infinite number, of retransmission attempts of a particular audio packet. Alternatively to flushing audio packets, some embodiments may reset the entire communications link when the number of retransmissions exceeds a maximum number if transmission attempts.

The provision of frame buffers at the respective audio rendering devices allows for an efficient synchronisation of the audio channels. The first and/or second buffer may be a frame buffer configured to buffer audio data in units of frames. In some embodiments, each received audio packet includes a single frame. In other embodiments some or all audio packets may include more than one frame. It will be appreciated that the audio rendering device may buffer the received audio data in encoded form, e.g. as received from the wireless communications device. In other embodiments, the audio rendering device may process the received audio data before buffering it. For example, when the audio data is received by the audio rendering device as encoded audio data, the audio rendering device may buffer the audio data in encoded form or it may initially decode the encoded audio data and buffer the audio data in decoded form. Buffering the audio data in encoded form typically reduces the required size of the buffer. Buffering the audio data after decoding may reduce the latency of the rendering steps of frames that have been released from the buffer. Generally, the audio rendering device may, in some embodiments, process the received audio data before buffering it while, in other embodiments, the audio rendering device may buffer the received audio data without prior processing.

The buffer may be configured to hold multiple frames. When the audio rendering device receives a new frame of audio data, the received frame of audio data is placed in the buffer. The audio rendering device is further configured to release the oldest frame of audio data for rendering, e.g. to a signal processing circuit that is configured to decode the frame of audio data so as to create an audio signal that can be forwarded to a output transducer. The audio rendering device may be configured to release frames of audio data from the buffer at buffer release times which may be regularly spaced apart, e.g. spaced apart by an interval that corresponds to the duration of an audio signal encoded by one frame of audio data. It is generally preferred that the first buffer release times are regularly spaced apart by a first interval and wherein the second buffer release times are regularly spaced apart by a second interval equal to the first interval. To this end, the audio rendering device may cause release of the oldest frame of audio data in the buffer responsive to the receipt of a new frame of audio data which is then placed in the buffer. Hence, the buffer release times may be determined from the times of receipt of the audio packets form the wireless communications device, which in turn is determined by the transmission schedule of the wireless communications device and any latencies of the transmission.

In particular, in some embodiments, the wireless communications device is configured to transmit the first plurality of audio packets and the second plurality of audio packets according to a transmission schedule, such that audio packets of the first plurality of audio packets are scheduled for transmission to the first audio rendering device and that each audio packet of the second plurality of audio packets is scheduled for transmission to the second audio rendering device at a delay interval after the corresponding audio packet of the first plurality of audio packets is scheduled for transmission; and wherein at least the first audio rendering device is configured to determine the delay interval based on at least one of the exchanged messages.

For example, the time interval between transmissions of consecutive audio packets to each of the audio rendering device may be between 10 ms and 20 ms. The delay between transmission of an audio packet to one of the audio rendering devices and the transmission of a corresponding audio packet to the other audio rendering device may be between 1 ms and up to the length of the time interval, e.g. up to between 10 ms and 20 ms.

Accordingly, when the audio packets are transmitted to the respective audio rendering devices at regular intervals and such that the interval length is the same for both audio rendering devices, the audio rendering devices also release frames from their respective buffers at regularly spaced apart release times where the buffer release times are spaced apart by the same interval for both audio rendering devices, thus facilitating synchronisation of the audio channels.

Moreover when the audio rendering devices determine, based on messages communicated between the audio rendering devices, the relative delay of the transmission of the audio packets to the first and second audio rendering device respectively, proper synchronisation may be performed without the need for additional scheduling information from the wireless communications. Moreover, the synchronisation requires only small amounts of data to be exchanged between the audio rendering devices.

Accordingly, in some embodiments, the first audio rendering device is configured to:
determine first packet receipt times indicative of respective times of receipt of audio packets of the first plurality of audio packets from the wireless communications device; and to
determine the first buffer release times from the determined first packet receipt times and from the delay interval.

In one embodiment, the first audio rendering device is configured to release audio packets from the first buffer at the determined packet receipt times delayed by a buffer release delay configured to compensate for one or more delays, including for said delay interval.

It will be appreciated that the second audio rendering device may perform a corresponding process when the transmission of audio packets to the first audio rendering device is delayed relative to the transmission of corresponding audio packets to the second audio rendering device. In any event, the audio rendering device that receives the audio packets later than the other audio rendering device receives the corresponding audio packets does not need to further delay release of audio frames from its buffer relative to the time of receipt of new audio frames in order to compensate for the relative delay in transmissions by the wireless communications device.

In some embodiments, at least the first audio rendering device is configured to receive a message from the second audio rendering device indicative of a time of receipt, by the second audio rendering device, of a previous one of the second plurality of audio packets; and to determine the delay interval from the received message and from a time of receipt of a previous one of the first plurality of audio packets by the first audio rendering device. Accordingly, the first audio rendering device may efficiently determine the applicable delay without the need for large amounts of data to be exchanged between the audio rendering devices. For example, there is no need for a synchronisation of internal clocks of the respective audio rendering devices. Moreover, as the transmission delay is generally constant during a communications session, it may be sufficient to perform the determination of the delay interval only at the beginning of the communications session, e.g. based on the initial audio packets. Nevertheless, in some embodiments, the determination of the delay interval may be repeated, e.g. periodically, during the communications session. It will further be appreciated that, in some embodiments, both audio rendering devices receive one or more messages from the corresponding other audio rendering device, e.g. messages indicative of a time of receipt, by the corresponding other audio rendering device, of a previous one of the corresponding plurality of audio packets. Accordingly, the devices may determine which of the two devices receives the audio packets delayed relative to the other audio rendering device.

However, it will be appreciated that one or both audio rendering devices may add additional or alternative buffer release delays in order to compensate for other latency factors.

As discussed above, in some embodiments, the wireless communications device is configured to retransmit an audio packet responsive to failure to receipt an acknowledgement indication from the corresponding audio rendering device indicative of successful receipt. It will be appreciated that such retransmission, in particular if multiple retransmissions occur for an audio packet, may cause transmission of subsequent audio packets to be delayed. Such delays may be accommodated by the receiving audio rendering device by means of the buffer. In some embodiments, the wireless communications device may be configured to transmit more than one audio packet at a subsequent scheduled transmission time and/or transmit additional audio packets between scheduled transmission times so as to allow the receiving audio rendering device to replenish its buffer.

Generally the frames of audio data are configured for synchronised rendering. To this end, for each frame of audio data for the second audio channel, the frames of audio data for the first audio channel may comprise a corresponding frame of audio data, such that the audio data in the frame for the second audio channel and audio data in the corresponding frame for the first audio channel are configured for simultaneous rendering as part of, respectively, the first audio channel and the second audio channel. In one embodiment, each frame of audio data for the first audio channel has an associated sequence number which may also be referred to as a frame index; wherein each frame of audio data for the second audio channel has an associated sequence number such that each frame of audio data for the first audio channel has a sequence number equal to the respective sequence number of the corresponding frame of audio data for the second audio channel. For example, frame K (K being a positive integer) for the first audio channel corresponds to frame K for the second audio channel while frame K+1 for the first audio channel corresponds to frame K+1 for the second audio channel.

The provision of respective buffers at the first and second audio rendering devices further allows synchronisation at a frame level, i.e. so as to ensure that frames for the first audio channel are rendered at the same time as the corresponding frame for the second audio channel. To this end, in some embodiments, the first audio rendering device is configured to receive a message from the second audio rendering device indicative of a sequence number of a frame scheduled for release from the second frame buffer at the next buffer release time. Accordingly, the first audio rendering device may be configured to maintain the first buffer responsive to the received message. In particular, maintaining the first buffer responsive to the received message may comprise one or more of:

- selecting a buffer depth of the first buffer;
- discarding a frame of audio data from the first buffer;
- delaying release of a frame of audio data from the first buffer;
- resetting the first buffer, e.g. so as to restart synchronisation.

The buffer depth of a buffer may be expressed as a number of frames the buffer currently accommodates. It will be appreciated that a smaller buffer depth reduces the overall latency of the system as well as memory requirements, while a larger buffer depth allows for an increased capability of the device to compensate for failed or delayed packet transmissions. Providing a mechanism to dynamically adapt the buffer depth based on information about the current state of the buffer of the other audio rendering device allows for an improved optimisation of the buffer depth. Typical buffer depths between 5 and 6 frames have been found to be suitable while a maximum buffer depth of 8 frames has been found sufficient for many situations. In some embodiments, the first audio rendering device may be configured to adapt the buffer depth, i.e. the number of frames currently accommodated in the buffer. For example, the first audio rendering device may be capable of change the buffer depth up to a maximum buffer depth. The buffer depth may e.g. be expressed as the current number of frames in the buffer or as an average number of frames in the buffer, averaged over a predetermined time interval.

The exchange of information about which frame is scheduled to be released from the buffer also allows the audio rendering devices to handle situations where a frame has not been received by one of the devices or has been received too late to be included into the real-time audio rendering. In such situations, one of the audio rendering devices may discard one or more frames, so as to realign its rendering with the sequence of frames rendered by the other audio rendering device. Alternatively one of the devices may delay release of a frame so as to wait for the other audio rendering device to get realigned. When delaying release of a frame the audio rendering device may insert a concealment frame, e.g. a silent frame or a frame whose audio samples are interpolated between the previous and the next, delayed frame.

It will be appreciated that, alternatively or additionally, the first and second audio rendering devices may exchange other information that may be used for maintaining the respective buffers and for synchronising the release of respective sequences of frames of audio frames.

For example, in some embodiments, the received message from the second audio rendering device is further indicative of an elapsed time since a receipt, by the second audio rendering device, of said frame scheduled for release from the second frame buffer at the next buffer release time. Alternatively or additionally, the received message from the second audio rendering device is further indicative of a second buffer depth of the second buffer. Again this information may be used by the first audio rendering device to adapt its buffer depth. As above, it will be appreciated that the second audio rendering device may receive corresponding information from the first audio rendering device.

In some embodiments, one or both audio rendering devices may be configured to send commands or requests to the corresponding other audio rendering device, e.g. so as to request one or more of the actions mentioned above, i.e. changing of the buffer depth, discarding a frame, delaying a frame and/or other actions. In some embodiments, to ensure the action is synchronous on both audio rendering devices, the action may be scheduled to occur at a specific frame index, e.g. predetermined by the algorithm, alternatively specified as part of the command or request.

Generally, at the beginning of a communications session, the wireless communications device may exchange one or more initial data packets with each of the audio rendering devices for setting up the communications link, e.g. so as to negotiate certain communications parameters.

Each audio packet may include one or more header sections and a payload section. The payload section may include the frame of audio data, such as encoded audio data. The audio packet may comprise a sequence number associated with the frame of audio data.

The wireless communications device may be an audio-enabled communications device such as a smartphone or mobile phone, an audio-enabled tablet, a cordless phone, a TV-set, a portable microphone array etc. In particular, the wireless communications device may be an audio-enabled portable communications device.

The wireless communications device may comprise an antenna, a transceiver and a communications controller, such as a Bluetooth LE controller for implementing the communication of audio packets to the audio rendering devices. The wireless communications device may further comprise a signal processing unit configured to receive and process an audio signal so as to create frames of digital audio samples. Alternatively or additionally, the wireless communications device may comprise data storage for storing digital audio files encoding frames of digital audio samples.

Similarly, in some embodiments, the first audio rendering device comprises a first transceiver and a first antenna. Also, the second audio rendering device comprises a second transceiver and a second antenna. The first audio rendering device may comprise a first communications controller configured control the wireless communication and to perform the steps of the method disclosed herein. In particular, the communication controller may be configured to implement one or more layers of a suitable communications protocol.

The first audio rendering device may further comprise a signal processing circuit configured to process the received audio data from the communication controller and to generate an audio signal reflecting the received audio data.

The first audio rendering device may further comprise an output transducer operatively coupled to the digital processing circuit and operable to generate sound responsive to the audio signal.

Each of the first and second audio rendering devices may comprise a hearing instrument or hearing aid, for example jointly forming a wireless binaural hearing aid system. In other embodiments, one or both of the first and second audio rendering devices comprises a battery powered audio-enabled device such as an earphone, headset, smartphone, remote microphone array, remote signal processor etc. Generally, the first audio rendering device and/or the second audio rendering device may be a user-worn device, such as a device worn at, behind and/or in a user's ear. In particular, the first and second audio rendering devices may be configured to be worn at, behind and/or in respective ones of a user's ears.

In particular, in some embodiments, the audio rendering system comprises first and second hearing instruments or aids. Each of the first and second hearing instruments or aids may receive and deliver a binaurally processed hearing loss compensated audio signal to a user or patient via respective loudspeakers or receivers as discussed in further detail below with reference to the appended drawings. Each of the first and second hearing instruments or aids may comprise a BTE, RIE, ITE, ITC, CIC, etc. type of hearing instrument. Typically, only a severely limited amount of power is available from a power supply of a hearing instrument. For example, power is typically supplied from a conventional $ZnO_2$ battery in a hearing aid. In the design of a hearing aid, the size and the power consumption are important considerations.

Each of the first and second hearing instruments may comprise an input transducer, such as one or several microphones, configured to output an audio signal based on a signal applied to the input transducer and representing sound. Each of the first and second hearing instruments may comprise a hearing loss processor configured to compensate a hearing loss of a user of the hearing aid and output a hearing loss compensated audio signal. The hearing loss compensated audio signal may be adapted to restore loudness such that loudness of the applied signal as it would have been perceived by a normal listener substantially matches the loudness of the hearing loss compensated signal as perceived by the user. Each of the first and second hearing instruments or hearing aids may additionally comprise an output transducer, such as a receiver or loudspeaker, an implanted transducer, etc., configured to output an auditory output signal based on the hearing loss compensated audio signal that can be received by the human auditory system, whereby the user hears the sound. The input transducer may also comprise a telecoil that converts a time-varying magnetic field at the telecoil into a corresponding varying analogue audio signal in which the instantaneous voltage of the audio signal varies continuously with the varying magnetic field strength at the telecoil. Telecoils may be used to increase the signal to noise ratio of speech from a speaker addressing a number of people in a public place, e.g. in a church, an auditorium, a theatre, a cinema, etc., or through a public address systems, such as in a railway station, an airport, a shopping mall, etc. Speech from the speaker is converted to a magnetic field with an induction loop system (also called "hearing loop"), and the telecoil is used to magnetically pick up the magnetically transmitted speech signal. The input transducer may further comprise at least two spaced apart microphones, and a beamformer configured for combining microphone output signals of the at least two spaced apart microphones into a directional microphone signal. The input transducer may comprise one or more microphones and a telecoil and a switch, e.g. for selection of an omnidirectional microphone signal, or a directional microphone signal, or a telecoil signal, either alone or in any combination, as the audio signal. Typically, the analogue audio signal is made suitable for digital signal processing by conversion into a corresponding digital audio signal in an analogue-to-digital converter whereby the amplitude of the analogue audio signal is represented by a binary number. In this way, a discrete-time and discrete-amplitude digital audio signal in the form of a sequence of digital values represents the continuous-time and continuous-amplitude analogue audio signal. Throughout the present disclosure, the "audio signal" may be used to identify any analogue or digital signal forming part of the signal path from the output of the input transducer to an input of the hearing loss processor. Throughout the present disclosure, the "hearing loss compensated audio signal" may be used to identify any analogue or digital signal forming part of the signal path from the output of the hearing loss processor to an input of the output transducer possibly via a digital-to-analogue converter.

Each of the first and second radio transceivers may comprise both a wireless transmitter and a wireless receiver. The transmitter and receiver may share common circuitry and/or a single housing. Alternatively, the transmitter and receiver may share no circuitry, and the wireless communication unit may comprise separate devices with the transmitter and the receiver, respectively. Signal processing in each of the first and second audio rendering device may be performed by dedicated hardware or may be performed in one or more signal processors, or performed in a combination of dedicated hardware and one or more signal processors. Likewise, the operations performed by each of the first and second communication controllers may be performed by dedicated hardware or may be performed in one or more processors, or performed in a combination of dedicated hardware and one or more processors. As used herein, the terms "processor", "signal processor", "controller", "system", etc., are intended to refer to microprocessor or CPU-related entities, either hardware, a combination of hardware and software, software, or software in execution. For example, a "processor", "signal processor", "controller", "system", etc., may be, but is not limited to being, a process running on a processor, a processor, an object, an executable file, a thread of execution, and/or a program. By way of illustration, the terms "processor", "signal processor", "controller", "system", etc., designate both an application running on a processor and a hardware processor. One or more "processors", "signal processors", "controllers", "systems" and the like, or any combination hereof, may reside within a process and/or thread of execution, and one or more "processors", "signal processors", "controllers", "systems", etc., or any combination hereof, may be localized on one hardware processor, possibly in combination with other hardware circuitry, and/or distributed between two or more hardware processors, possibly in combination with other hardware circuitry. Also, a processor (or similar terms) may be any component or any combination of components that is capable of performing signal processing. For examples, the signal processor may be an ASIC processor, a FPGA processor, a general purpose processor, a microprocessor, a circuit component, or an integrated circuit.

The present disclosure relates to different aspects including the system described above and in the following, corresponding apparatus, systems, methods, and/or products, each yielding one or more of the benefits and advantages described in connection with one or more of the other aspects, and each having one or more embodiments corresponding to the embodiments described in connection with one or more of the other aspects and/or disclosed in the appended claims.

In particular, according to one aspect, disclosed herein is an audio rendering device; comprising:
  at least one wireless communications interface configured to
    receive a first plurality of audio packets from a wireless communications device, the first plurality of audio packets including frames of audio data for a first audio channel from a set of one or more audio channels;
    exchange messages with another audio rendering device, the other audio rendering device being configured to receive a second plurality of audio packets from said wireless communications device, the second plurality of audio packets including frames of audio data for a second audio channel from said set of one or more audio channels;
  a signal processor configured to process the frames of audio data included in the first plurality of audio packets for rendering by the first audio rendering device;
  wherein the at least one wireless communications interface is further configured to:
    maintain a first buffer of received frames of audio data and to release, at respective first buffer release times, frames of audio data from said first buffer to the signal processor for rendering;
    receive one or more messages from the other audio rendering device; and to
    synchronise, based on the received one or more messages; the first buffer release times with second buffer release times at which the other audio rendering device releases frames of audio data from a second buffer of received frames of audio data maintained by the other audio rendering device.

The wireless communications interface may comprise a single antenna and/or a single transceiver and/or a single communications controller for implementing the receipt of audio packets from the wireless communications device and the receipt of messages from the other audio rendering device. Alternatively, the audio rendering device may include separate antenna and/or separate transceivers and/or separate communications controllers for implementing the receipt of audio packets from the wireless communications device and the receipt of messages from the other audio rendering device, respectively.

According to yet another aspect, disclosed herein is a method, implemented by a pair of audio rendering devices, the pair comprising a first audio rendering device and a second audio rendering device, of synchronising audio content rendered by said pair of audio rendering devices; the method comprising:
  receiving, by the first audio rendering device from a wireless communications device; a first plurality of audio packets, the first plurality of audio packets including frames of audio data for a first audio channel from a set of one or more audio channels;
  receiving, by the second audio rendering device from the wireless communications device; a second plurality of audio packets, the second plurality of audio packets including frames of audio data for a second audio channel from said set of one or more audio channels;
  maintaining, by the first audio rendering device, a first buffer of received frames of audio data and releasing frames of audio data from said first buffer for rendering at respective first buffer release times;
  maintaining, by the second audio rendering device, a second buffer of received frames of audio data and releasing frames of audio data from said second buffer for rendering at respective second buffer release times;
  receiving, by the first audio rendering device, one or more messages from the second audio rendering device; and
  synchronizing, by at least the first audio rendering device, the first buffer release times with the second buffer release times based on the received one or more messages.

According to yet another aspect, disclosed herein is an audio rendering device; comprising:
  a first communications interface configured to receive a first plurality of audio packets from a wireless communications device, the first plurality of audio packets including audio data for a first audio channel from a set of one or more audio channels;
  a second communications interface configured to wirelessly communicate with another audio rendering device, the other audio rendering device being configured to receive a second plurality of audio packets from said wireless communications device, the second plurality of audio packets including audio data for a second audio channel from said set of one or more audio channels; for each audio packet in the first plurality of audio packets, the second plurality of audio packets comprising a corresponding audio packet, such that audio data in the audio packet in the first plurality of audio packets and audio data in the corresponding audio packet from the second plurality of audio packets are configured for simultaneous rendering as part of, respectively, the first audio channel and the second audio channel; wherein the first plurality of audio packets and the second plurality of audio packets are transmitted by the wireless communications device according to a transmission schedule such that audio packets from the first plurality of audio packets are scheduled for transmission to the audio rendering device and that each audio packet of the second plurality of audio packets is scheduled for transmission at a delay interval after the corresponding audio packet from the first plurality of audio packets is scheduled for transmission;
  a signal processor configured to render audio content based on the audio data included in the first plurality of audio packets;
  wherein the audio rendering device is configured to determine, based on communication with the other audio rendering device, the delay interval and to delay rendering of each of the first plurality of audio packets by the determined delay interval.

An audio rendering device includes: at least one wireless communications interface configured to receive a first plurality of audio packets from a wireless communication device, the first plurality of audio packets including frames of audio data for a first audio channel from a set of one or more audio channels; and a processing unit; wherein the audio rendering device is configured to release, at respective first buffer release times, the frames of the audio data for the first audio channel from a first buffer for rendering by the processing unit; wherein the audio rendering device is configured to receive one or more messages from an other audio rendering device; and wherein the audio rendering device is configured to synchronize the first buffer release times with second buffer release times associated with the other audio rendering device based on the received one or more messages.

Optionally, the first buffer release times are regularly spaced apart by a first interval, and wherein the second buffer release times are regularly spaced apart by a second interval equal to the first interval.

Optionally, the audio rendering device is configured to determine first packet receipt times indicative of respective times of receipt of audio packets of the first plurality of audio packets from the wireless communication device, and to determine the first buffer release times based on the determined first packet receipt times Optionally, the audio rendering device is configured to determine at least one of the first buffer release times based on a delay interval between a transmission of one of the first plurality of audio packets and a transmission of one of a second plurality of audio packets for the other audio rendering device.

Optionally, the audio rendering device is configured to release one of the frames of the audio data from the first buffer at a time that is equal to a packet receipt time for the one of the frames of the audio data in the first plurality of audio packets delayed by a buffer delay configured to compensate for the delay interval.

Optionally, at least one of the one or more messages is indicative of a time of receipt, by the other audio rendering device, of a previous one of a second plurality of audio packets; and wherein the audio rendering device is configured to determine a delay interval based on (1) the at least one of the one or more messages, and (2) a time of receipt of a previous one of the first plurality of audio packets by the audio rendering device.

Optionally, at least one of the one or more messages from the other audio rendering device is indicative of a sequence number of a frame scheduled for release at the other audio rendering device.

Optionally, the audio rendering device is configured to maintain the first buffer responsive to the received one or more messages.

Optionally, at least one of the one or more messages from the other audio rendering device is indicative of an elapsed time since a receipt, by the other audio rendering device, of a frame of audio data scheduled for release from the a second buffer associated with the other audio rendering device at a next buffer release time.

Optionally, at least one of the one or more messages from the other audio rendering device is indicative of a buffer depth of a second buffer associated with the other audio rendering device.

An audio rendering system includes the audio rendering device and the wireless communication device.

Optionally, the wireless communication device is configured to transmit the first plurality of audio packets to the audio rendering device, and to transmit a second plurality of audio packets to the other audio rendering device according to a transmission schedule.

Optionally, the wireless communication device is configured to transmit each audio packet of the second plurality of audio packets to the other audio rendering device at a delay interval after a corresponding audio packet of the first plurality of audio packets is transmitted.

Optionally, the audio rendering device is configured to determine the delay interval based on at least one of the one or more messages.

An audio rendering system includes the audio rendering device, and the other audio rendering device.

Optionally, the other audio rendering device is configured to receive a second plurality of audio packets, the second plurality of audio packets including frames of audio data for a second audio channel from the set of one or more audio channels.

Optionally, the second audio rendering device is configured to release, at the respective second buffer release times, the frames of audio data for the second audio channel from a second buffer for rendering.

Optionally, the audio rendering device and the other audio rendering device are configured to simultaneous render one of the frames of the audio data in the first plurality of audio packets for the first audio channel, and one of the frames of the audio data in the second plurality of audio packets for the second audio channel.

Optionally, each frame of audio data in the first plurality of audio packets for the first audio channel has an associated sequence number, and wherein each frame of audio data in the second plurality of audio packets for the second audio channel has an associated sequence number.

Optionally, the audio rendering device is configured to maintain the first buffer by: selecting a buffer depth of the first buffer; discarding a frame of audio data from the first buffer; delaying release of a frame of audio data from the first buffer; resetting the first buffer; or one or more of the foregoing.

Optionally, each frame of audio data for the first audio channel has a sequence number equal to a corresponding sequence number of a corresponding frame of audio data for the second audio channel.

Optionally, each frame of audio data in the first plurality of audio packets has a sequence number equal to a corresponding sequence number of a corresponding one of the frames of audio data in the second plurality of audio packets.

An audio rendering device includes: at least one wireless communication interface configured to receive a first plurality of audio packets from a wireless communication device, the first plurality of audio packets including frames of audio data for a first audio channel from a set of one or more audio channels, wherein the at least one wireless communication interface is also configured to receive one or more messages from an other audio rendering device, the other audio rendering device being configured to receive a second plurality of audio packets from the wireless communication device, the second plurality of audio packets including frames of audio data for a second audio channel from the set of one or more audio channels; a signal processor configured to process the frames of audio data included in the first plurality of audio packets for rendering; wherein the audio rendering device is configured to release, at respective first buffer release times, the frames of the audio data in the first plurality of audio packets from a first buffer to the signal processor for rendering; and wherein the audio rendering device is configured to synchronize, based on the received one or more messages, the first buffer release times with second buffer release times at which the other audio rendering device releases frames of audio data in the second plurality of audio packets from a second buffer associated with the other audio rendering device.

A method of synchronizing audio content rendered by a pair of audio rendering devices, the pair of audio rendering devices comprising a first audio rendering device and a second audio rendering device, includes: receiving, by the first audio rendering device, a first plurality of audio packets from a wireless communication device, the first plurality of audio packets including frames of audio data for a first audio channel from a set of one or more audio channels; receiving, by the second audio rendering device, a second plurality of audio packets from the wireless communication device, the second plurality of audio packets including frames of audio data for a second audio channel from the set of one or more audio channels; releasing frames of audio data in the first plurality of audio packets from a first buffer for rendering at respective first buffer release times; releasing frames of audio data in the second plurality of audio packets from a second buffer for rendering at respective second buffer release times; receiving, by the first audio rendering device, one or more messages from the second audio rendering device; and synchronizing, by at least the first audio rendering device, the first buffer release times with the second buffer release times based on the received one or more messages.

Other features and advantageous will be described below in the detailed description.

BRIEF DESCRIPTION OF THE DRAWINGS

In the following, preferred embodiments of the various aspects disclosed herein are described in more detail with reference to the appended drawings, wherein.

DETAILED DESCRIPTION OF EMBODIMENTS

Figure 1:
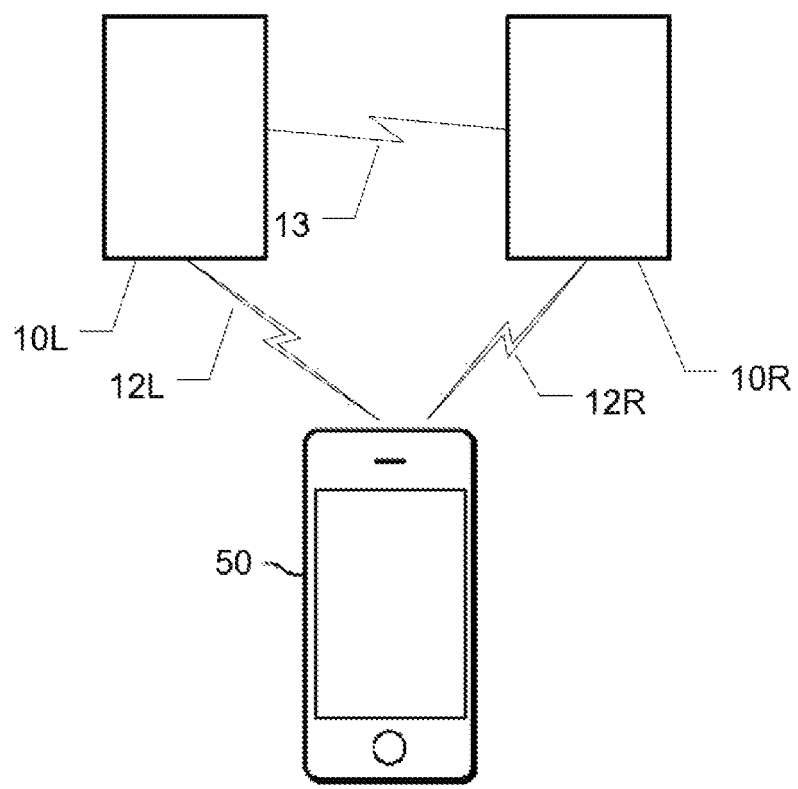
FIG. 1 schematically illustrates an embodiment of an audio rendering system.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

In the following, preferred embodiments of the various aspects disclosed herein are described in more detail with reference to the appended drawings and in the context of hearing instruments. In the following embodiments, one or each of the first and second audio rendering devices comprises a respective hearing instrument as discussed in additional detail below. The skilled person will understand that the accompanying drawings are schematic and simplified for clarity.

FIG. 1 schematically illustrates an embodiment of an audio rendering system. In particular, the audio rendering system comprises a wireless communications device 50, a first audio rendering device 10L and a second audio rendering device 10R. The wireless communications device 50 is communicatively coupled to the first audio rendering device 10L via a first wireless communications link 12L and to the second audio rendering device 10R via a second wireless communications link 12R. Hence, the wireless communications device establishes respective, bi-directional communications connections with each of the audio rendering devices. The first wireless communications link 12L is a direct, bi-directional link between the wireless communications device 50 and the first audio rendering device 10L; in particular, the communication between the wireless communications device 50 and the first audio rendering device 10L does not involve the second audio rendering device 10R. Similarly, the second wireless communications link 12R is a direct, bi-directional link between the wireless communications device 50 and the second audio rendering device 10R; in particular, the communication between the wireless communications device 50 and the second audio rendering device 10R does not involve the first audio rendering device 10L. Moreover, the first audio rendering device 10L is communicatively coupled to the second audio rendering device 10R via a direct wireless communications link 13. In particular, the communications link 13 between the first audio rendering device 10L and the second audio rendering device 10R does not involve the wireless communications device 50. The wireless communications device 50 may be a smartphone or mobile phone, an audio-enabled tablet, a cordless phone, a TV-set, a portable microphone array etc. The first and second audio rendering devices may be respective hearing instruments or aids as will be described in greater detail below.

Figure 2:
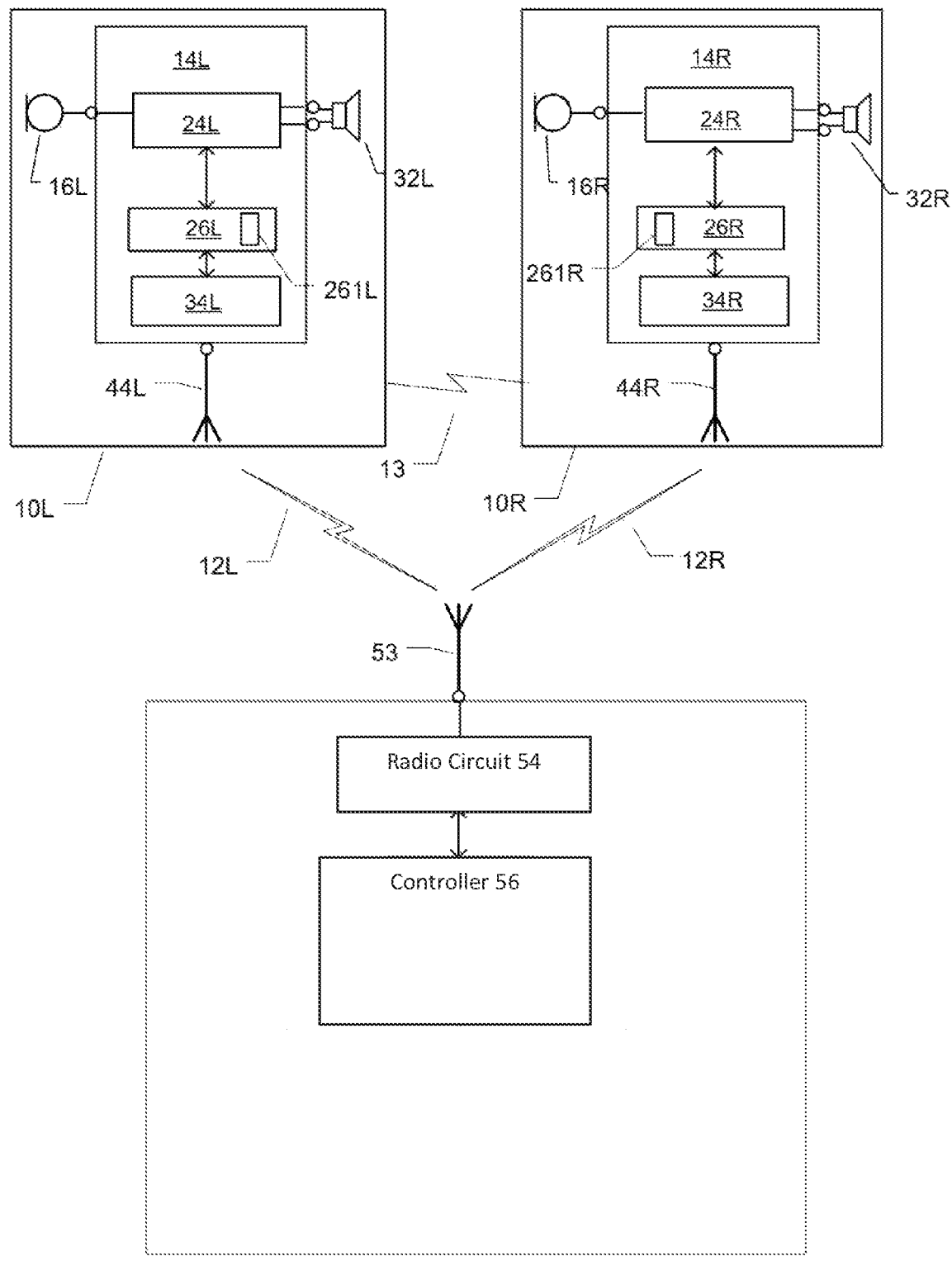
FIG. 2 schematically illustrates another embodiment of an audio rendering system.

FIG. 2 schematically illustrates an embodiment of an audio rendering system. As in the previous embodiment, the audio rendering system comprises a wireless communications device 50, a first audio rendering device and a second audio rendering device. The first and second audio rendering devices form a wireless binaural hearing aid system comprising a left ear hearing aid or instrument 10L and a right ear hearing aid or instrument 10R, each of which comprises a wireless communication unit for connection to the wireless communications device 50 and to the respective other hearing instrument. In the present embodiment, the left ear and right ear hearing aids 10L, 10R are connected to each other via a bi-directional wireless communication channel or link 13. A unique ID may be associated with each of the left ear and right ear hearing aids 10L, 10R. Alternatively, the left and right ear hearing aids may be connected with each other via another wireless or wired communications channel, e.g. via a magnetic inductive link.

Each hearing aid is further communicatively connected to the wireless communications device 50 via wireless communication links 12L and 12R, respectively. Hence, the wireless communications device 50 establishes respective bidirectional communications connections with each of the hearing aids.

Wireless communication between the respective devices of the illustrated binaural hearing aid system may be performed via the 2.4 GHz industrial scientific medical (ISM) band which may comprise a number of spaced apart frequency bands or channels. Each of the spaced apart frequency bands or channels may possess a bandwidth between 0.5-2.0 MHz such as about 1.0 MHz. The hearing aids 10L, 10R are configured to communicate with the wireless communications device 50 in accordance with Bluetooth Low Energy (Bluetooth LE) for example according to the Bluetooth Core Specification Version 4.1, 4.2 or 5. However, communications controllers of the wireless communication units of each of the left and right ear hearing aids 10L, 10R have been adapted so as to enable receipt of real-time audio data sets through each of the wireless communication links 12L, 12R as explained in further detail below and for synchronised rendering of the received audio data. To this end, the communications controllers of the hearing aids 10L, 10R have further been adapted to enable communication between the hearing aids via wireless communications link 13. The communication via communications link 13 is also performed in the 2.4 GHz ISM band but may employ a communications protocol other than Bluetooth.

The left hearing aid 10L and the right hearing aid 10R may be substantially identical in some embodiments expect for the above-described unique ID. Accordingly, the following description of the features of the left hearing aid 10L also applies to the right hearing aid 10R. The left hearing aid 10L may comprise a $ZnO_2$ battery (not shown) that is connected for supplying power to the hearing aid circuit 14. The left hearing aid 10L comprises an input transducer in the form of a microphone 16. The microphone 16 outputs an analogue or digital audio signal based on an acoustic sound signal arriving at the microphone 16 when the left hearing aid 10L is operating. If the microphone 16 outputs an analogue audio signal the hearing aid circuit 14 may comprise an analogue-to-digital converter (not shown) which converts the analogue audio signal into a corresponding digital audio signal for digital signal processing in the hearing aid circuit 14. In particular in a hearing loss processor 24L that is configured to compensate a hearing loss of a user of the left hearing aid 10. Preferably, the hearing loss processor 24L comprises a dynamic range compressor well-known in the art for compensation of frequency dependent loss of dynamic range of the user often termed recruitment in the art. Accordingly, the hearing loss processor 24L outputs a hearing loss compensated audio signal to a loudspeaker or receiver 32L. The loudspeaker or receiver 32 converts the hearing loss compensated audio signal into a corresponding acoustic signal for transmission towards an eardrum of the user. Consequently, the user hears the sound arriving at the microphone; however, compensated for the user's individual hearing loss. The hearing aid may be configured to restore loudness, such that loudness of the hearing loss compensated signal as perceived by the user wearing the hearing aid 10 substantially matches the loudness of the acoustic sound signal arriving at the microphone 16 as it would have been perceived by a listener with normal hearing.

The hearing aid circuit 14L further includes a wireless communications unit which comprises a radio portion or transceiver 34L that is configured to communicate wirelessly with the right or second hearing aid 10R and with the wireless communications device 50. The wireless communications unit comprises a first communications controller 26L performing various tasks associated with the communications protocols and possibly other tasks. The hearing loss processor 24L may comprise a software programmable microprocessor such as a Digital Signal Processor. The operation of the left hearing aid 10L may be controlled by a suitable operating system executed on the software programmable microprocessor. The operating system may be configured to manage hearing aid hardware and software resources, e.g. including the hearing loss processor 24L and possibly other processors and associated signal processing algorithms, the wireless communications unit, certain memory resources etc. The operating system may schedule tasks for efficient use of the hearing aid resources and may further include accounting software for cost allocation, including power consumption, processor time, memory locations, wireless transmissions, and other resources. The operating system controls, in cooperation with the first communications controller 26L, the radio transceiver 34L to perform the bi-directional wireless communication with the right or second hearing aid 10R and with the wireless communications device 50 in accordance with the present methodology or protocol for receiving and synchronising audio data. The wireless communications device 50 may operate as a master device and the left and right hearing aids 10L, 10R as respective slaves in connection with bi-directional data communication between the device under the audio-enabled Bluetooth LE protocol.

The wireless communications device 50 comprises a radio portion or circuit 54 that is configured to communicate wirelessly with the corresponding radio portions or circuits 34L, 34R of the left and right hearing aids 10L, 10R, respectively. The wireless communications device 50 also comprises a wireless communication unit which comprises a Bluetooth LE controller 56 performing the various communication protocol related tasks in accordance with the audio-enabled Bluetooth LE protocol and possibly other tasks. Audio or other data packets or data sets for transmission over the wireless communication links 12L, 12R are supplied by the Bluetooth LE controller 56 to the radio circuit 54. Data packets received by the radio portion or circuit 54 via RF antenna 53 are forwarded to the Bluetooth LE controller 56 for further data processing. The skilled person will appreciate that the wireless communications device 50 typically will include numerous additional hardware and software resources in addition to those schematically illustrated as is well-known in the art of mobile phones.

The audio packets generated and transmitted by the wireless communications device 50 comprise respective frames of audio data such that each hearing aid may receive the audio data and deliver audio signal to the user or patient via the respective loudspeakers or receivers 32L, 32R. Optionally, the hearing aids may process the received audio data so as to compensate for hearing loss, e.g. so as to provide a binaurally processed hearing loss compensated audio signal. The hearing aids 10L,R are further configured to exchange data packets including messages or other control data with each other, using the respective radio transceivers 34L, 34R and antenna 44L, 44R. The exchanged messages may include control information or data for example to synchronize operation between the left and right hearing aids 10L, 10R as will be described in more detail below.

Figure 6:
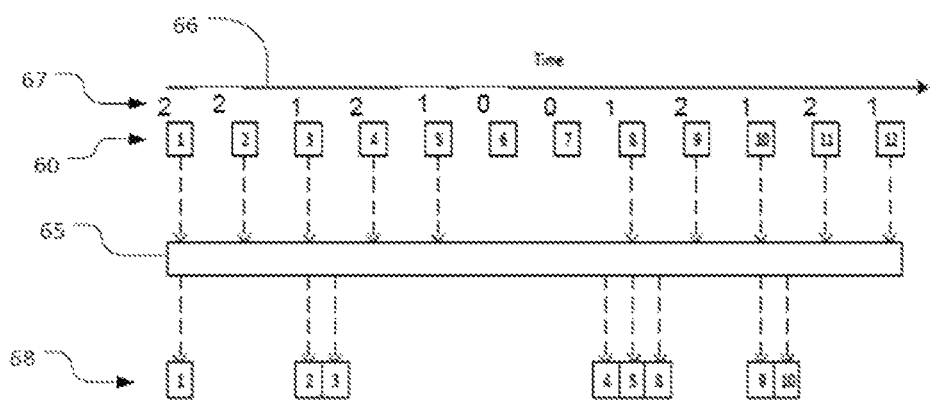
FIG. 6 illustrates and example of the operation of the transmission of frames of audio data by the wireless communications device of an audio rendering system as described herein.

The transmission of audio packets by the wireless communications device 50 will typically correspond to environmental conditions with low levels of interfering electromagnetic noise in the utilized frequency band or bands such that transmission of each audio packet may be successful at the first transmission attempt or first transmission. In the latter situation there is no need for retransmission of the audio packets. However, the wireless communications device 50 may be configured to cope with a certain error rate in the transmitted audio packets. This feature is particularly helpful for audio packet transmission in wireless binaural hearing instrument systems where the shadowing effect of the user's head may lead to a relatively high packet error rate (PER). The data packet transmission methodology may enable retransmission of lost audio packets. The number of retransmission of an audio packet may be performed until an acknowledgement of successful receipt has been received by the wireless communications device from the corresponding hearing aid. It will be appreciated that, in some embodiments, the number of retransmissions may be limited to a certain maximum number of times. In some embodiments, when an audio packet has been retransmitted a large number of times, the resulting delay may be compensated by the wireless communications device by skipping one or more subsequent audio frames and/or by temporarily transmitting a larger number of frames, e.g. as illustrated in FIG. 6. Generally, audio packet transmission latency is an important feature of the transmission methodology or protocol if the respective audio data or frames of the audio packets represent real time audio signals of the left and/or right hearing aids 10L, 10R. The loss of audio frames from time to time when a particular audio packet has been unsuccessfully retransmitted the maximum number of times or an increased transmission latency due to multiple retransmissions may be compensated or at least mitigated by the hearing aids. Loss of audio packets may be mitigated by adding a suitable audio codec to the hearing aid circuit 14L, 14R. The audio codec may be able to handle a certain amount of audio frame loss of an incoming real time audio data stream from the first or second communication controller 26L, 26R. The audio codec may for example be configured to execute a Packet Loss Concealment algorithm to perceptually mask the lost audio frames of incoming real time audio data stream.

Moreover, the communications controllers 26L and 26R comprise respective frame buffers 261L and 261R, respectively. Alternatively, the buffers may be implemented in the respective transceiver circuits 34L, 34R. Each frame buffer is configured to temporarily buffer one or more received frames of audio data so as to allow the communications controller to forward audio frames at a constant rate to the corresponding hearing loss processor 24L, 24R, respectively, for signal processing of the received audio frames, as will be described in more detail below.

Figure 3:
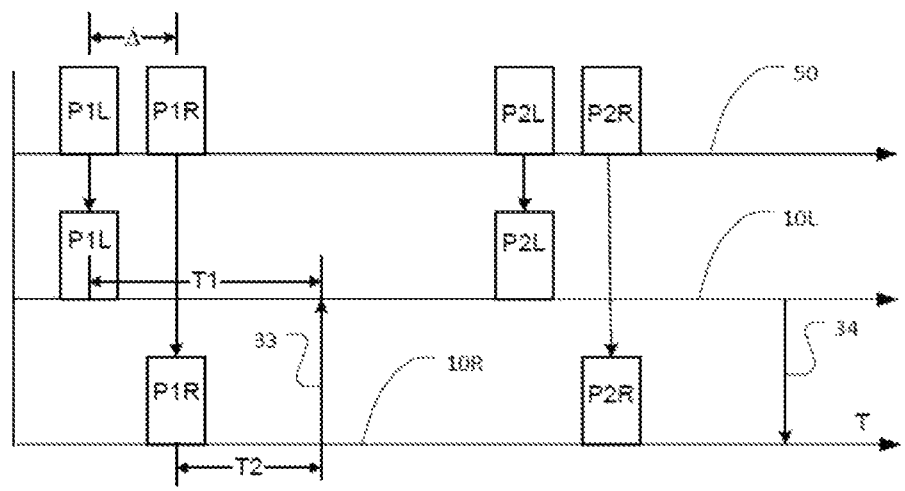
FIG. 3 schematically illustrates timing aspects of the communication between the devices of an embodiment of an audio rendering system.

FIG. 3 illustrates operation of an embodiment of an audio rendering system, e.g. one of the systems described in connection with FIG. 1 or FIG. 2.

In particular, the wireless communications device 50 transmits audio packets according to a transmission schedule such that the audio packets are transmitted at regularly spaced apart transmission events. Packets P1L, P2L etc. of a first plurality of audio packets are transmitted to the left hearing aid while audio packets P1R, P2R etc. of a second plurality of audio packets are transmitted to the right hearing aid. The transmission times of packets P1L, P2L is spaced apart by the same interval as the transmission times of packets P1R and P2R. However, transmission of packet P1R is delayed relative to the transmission of corresponding packet P1L by a delay interval Δ. Typically, the delay interval Δ is constant for a given communications session, i.e. constant for all audio packets of an audio stream.

The left hearing aid 10L receives the packets P1L, P2L etc. at regular intervals, while the right hearing aid 10R receives the packets P1R, P2R etc. at regular intervals of the same interval length. However due to the delayed transmission, the right hearing aid receives each packet later than the left hearing aid receives the corresponding packet. It will be appreciated that this delay may further be influenced by other latency factors. Moreover, it will be appreciated that, in some situations, the packets to the left hearing aid will be delayed relative to the corresponding packets of the right hearing aid instead.

Each of audio packets includes a frame of audio data, and the frames have an associated sequence number, also referred to as frame index. During normal transmission audio packet P1L includes frame number 1 of the left audio channel while P1R includes frame number 1 of the right audio channel, etc.

Upon receipt of an audio packet, each hearing aid places the corresponding frame of audio data into its frame buffer as the most recent frame. The hearing aid further releases the oldest frame from the frame buffer for processing by the signal processing circuit of the hearing loss circuit and for subsequent rendering by the receiver. The buffer is configured to hold a limited number of frames where the number of frames is referred to as the buffer depths. Typical buffer depths vary between 3 and 8 frames, such as 5-6 frames.

As the release from the frame buffer of each hearing aid is triggered by the time of receipt of a new audio packet, synchronized rendering of the audio frames by both hearing aids requires one of the hearing aids (in the example of FIG. 3 the left hearing aid) to delay release of each audio frame from the buffer by an additional delay so as to compensate for the delay Δ inherent in the transmission schedule of the wireless communications device and possible other latency factors.

To this end, the left and right hearing aids exchange messages 33 and 34 so as to exchange control data for synchronizing the rendering of the received audio data. The messages 33 and 34 are exchanged as lower priority data packets, e.g. such that at each communication event only a single message is transmitted either from the right hearing aid to the left hearing aid (illustrated by arrow 33) or from the left hearing aid to the right hearing aid (illustrated by arrow 34). Moreover, the control messages 33, 34 may be exchanged at a rate smaller than the transmission rate of the audio packets. It will be appreciated that other embodiments of an audio rendering system may use other transmission protocols for the exchanged messages. For example, other embodiments may exchange messages in both directions at each transmission event.

The exchanged messages include control data for use by the respective hearing aids for the synchronization of the rendering of the audio data.

In particular the exchanged messages include information from which the hearing aids determine the delay Δ. In a particular embodiment, the hearing aid 10R transmitting a control message 33 includes information about the time T2 elapsed since the receipt of the most recent audio packet P1R by said hearing aid 10R. The hearing aid 10L receiving the control message 33 may thus determine the time T1 elapsed since it received its most recent audio packet P1L and determine the applicable delay Δ from these times, e.g. as Δ=T1−T2. The other hearing aid may also determine the applicable delay from a corresponding reverse control message 34 including corresponding information. Even though control messages are exchanged repeatedly, it will be appreciated that, in some embodiments, only the control messages exchanged toward the beginning of an audio transmission include the above timing information for the determination of the delay Δ. As the transmission delay by the wireless communications device remains stable, the determined value for the delay may be utilized throughout the transmission. Nevertheless, in other embodiments, the above timing information is exchanged repeatedly, e.g. so as to allow the hearing aids to adjust the delay, e.g. so as to mitigate possible changes in the transmission environment and possible changes in the transmission latencies of the respective transmission channels. While, in the example of FIG. 3, the audio packets to the right hearing aid are delayed relative to the corresponding audio packets to the left hearing aids, it will be appreciated that the relative shift may be reverse, i.e. such that the audio packets to the left hearing aid are delayed relative to the corresponding audio packets to the right hearing aid. Hence, in such a situation, the left hearing aid may have to delay its buffer release times while the right hearing aid may not add any delay to the buffer release time to accommodate for the transmission delay.

In addition to the above timing information, some or all of the exchanged control messages also include information about the status of the frame buffer of the hearing aid that is transmitting the respective control message.

In particular, a hearing aid may transmit information to the other hearing aid about the sequence number of the oldest frame in the frame buffer, i.e. of the frame that is scheduled to be released from the buffer at the next buffer release event. Moreover, the hearing aid may transmit information about how long the oldest frame has been waiting in the buffer and/or other information, such as the buffer depth, etc.

The receiving hearing aid may use this information in a variety of ways to ensure synchronized release of frames from the frame buffer. For example, the hearing aid receiving a control message from the other hearing aid indicating the sequence number of the oldest frame in the frame buffer of the other hearing aid may compare this number with the sequence number of the oldest frame in its own frame buffer. Normally the sequence numbers are equal; however; packet losses, discarded audio packets, delays etc. may cause the sequence numbers of the oldest frames in the respective buffers to be different from each other. In such a situation, the hearing aid having an oldest frame in the frame buffer that has a lower sequence number than the oldest frame in the other hearing aid's frame buffer, may skip the oldest frame and release the subsequent frame from the buffer instead, so as to reestablish synchronization.

Alternatively, the hearing aid having a frame of higher sequence number as oldest frame in the buffer may delay release of the oldest frame and instead create a concealment frame.

In some embodiments, a hearing aid may dynamically change the buffer depth of its frame buffer, e.g. responsive to changes in the transmission environment.

For example, if a hearing aid receives information from the other hearing aid that the other hearing aid has a higher buffer depth and also a lower frame index it may be operable to increase its own buffer depth by duplicating its first entry. If the opposite is true, i.e. the hearing aid has fewer frames in its buffer and also a higher frame index, this hearing aid may be operable to decrease its own buffer depth by removing an entry, e.g. the first entry.

In some embodiments a hearing aid may monitor the quality of the communications link to the wireless communications device, e.g. by monitoring the gaps in the sequence of received frame indices. For example, if the hearing aid detects large gaps in relation to frames being skipped on the transmitting side, it may be operable to reconfigure the communications link to use more buffers on the transmitting side. For example, in the example of FIG. 6, an increase from 2 to 4 buffers would have prevented frames 6 and 7 from being skipped.

Hence, based on the exchanged messages between the hearing aids and/or based on the detected quality of the communications link to the wireless communications device, the hearing aids may synchronize the processing of the received audio frames both in respect of the sequence numbers of the currently processed frames and in respect of the exact timing of the processing of frames. The synchronizing of sequence numbers seeks to ensure that the frames of audio data processed by the hearing aids correspond to each other (i.e. have the same sequence number). The synchronizing of the timing of the processing of frames seeks to reduce or even eliminate any shift/delay in the processing of the received frames relative to the other hearing aid.

To this end, the exchanged messages may comprise one or more parameters, which may be combined as needed, e.g. in a static or dynamic way. The exchanged parameters included in the messages may be one or more of the following parameters and/or other parameters:

ConnectionOffset: The time offset from the current message's timestamp until the next connection event, e.g. the next BLE connection event. This parameter may be used for sample synchronization within a frame.

MaxDepth: The maximum buffer depth, i.e. the maximum number of frames which can be stored in the buffer.

CurrentDepth: The current number of frames stored in the buffer.

AverageDepth: The average number of frames stored in the buffer, where the average is defined over a suitable, e.g. a predetermined, period of time.

NextAudFrameIdxAvailable (for rendering): The index of the 'oldest' audio frame in the buffer.

NextAudFrameIdxExpected (for rendering): The next audio frame index expected by the rendering system. Except when frames are being inserted or removed, this value is normally incremented for each audio frame interval.

Figure 4:
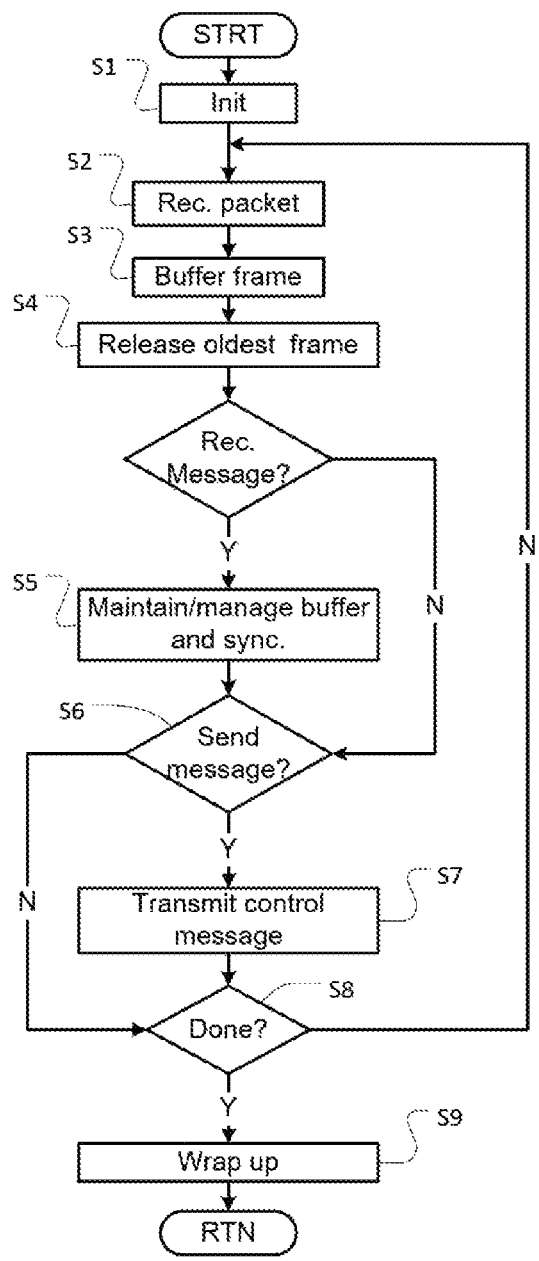
FIG. 4 shows a schematic flow diagram of a process performed by one of the audio rendering device of an audio rendering system as described herein.

FIG. 4 shows a schematic flow diagram of a process performed by one of the audio rendering device of an audio rendering system as described herein, e.g. of a system as described in connection with FIG. 1 or FIG. 2.

In initial step S1, the audio rendering device sets up respective communication links with the wireless communications device and the other audio rendering device. As part of this step, the audio rendering device may receive and/or transmit setup messages from/to the wireless communications device and/or the other audio rendering device, as is well known in the art. The audio rendering device further sets up its internal processing, e.g. including initializing the frame buffer.

Once the communications links are set up, the process proceeds at step S2 where it receives an audio packet from the wireless communications device. The audio packet includes a frame of audio data.

In step S3, the audio rendering device places the received audio frame in the frame buffer as newest frame.

In step S4, the audio rendering device releases the oldest frame in the frame buffer for processing by the digital signal processing circuit and rendering by a loudspeaker. The time at which the audio rendering device releases the frames may be determined by the time of receipt of a new frame and by a determined delay so as to compensate for a relative shift/delay of transmission times of the packet transmissions to the respective audio rendering devices.

If the process has received a control message from the other audio rendering device, the process proceeds at step S5; otherwise the process proceeds at step S6. At step S5, the process processes the received control messages so as to manage the buffer and/or determine the applicable delay of buffer release times.

In step S6, the process determines whether a control message should be transmitted to the other audio rendering device. The transmission of control messages may e.g. be triggered by changes in the buffer status or other operational trigger events or they may be sent at regular intervals. If a control message is to be sent, the process proceeds at step S7; otherwise the process proceeds at step S8.

At step S7, the process creates and transmits a control message to the other audio rendering device of the system. As described above, the control message may include one or more control parameters.

At step S8, the process determines whether the stream of audio data is completed. If so, the process proceeds to step S9 where it finishes processing the remaining frames in the buffer and terminates; otherwise the process returns to step S2.

Figure 5:
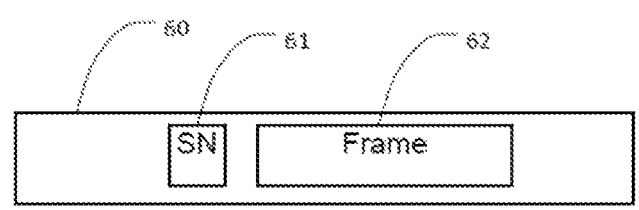
FIG. 5 schematically illustrates an example of an audio packet.

FIG. 5 schematically illustrates an example of an audio packet. The audio packet 60 includes a frame 62 of audio data and a sequence number 61 (frame index) associated with the frame 62. It will be appreciated that the audio packet may include additional sections, such as a CRC, header information etc.

FIG. 6 illustrates and example of the operation of the transmission of frames of audio data by the wireless communications device of an audio rendering system as described herein, e.g. of a system as described in connection with FIG. 1 or FIG. 2.

Generally, the transmission of audio packets may be performed according to a Bluetooth protocol as described in the Bluetooth specification. The drawing illustrates frames of audio data 60 being generated periodically for transmission to one of the audio rendering devices. The frames of the example of FIG. 6 are sequentially enumerated by frame indices 1-12. The generated frames are queued for transmission in one or more transmission buffers 65. The wireless communications device transmits the queued frames from the buffer to the corresponding audio rendering device at respective connection events as described herein. Once the wireless communications device has received a transmit acknowledgment 68 from the receiving device in respect of a transmitted frame, the wireless communications device removes the corresponding frame from the buffer, thus making a buffer slot available again for accommodating a subsequent frame. The wireless communications device may allow up to a maximum number of buffered frames at any time. In the example of FIG. 6, it is assumed that the connection is configured to queue up to two frames for transmission. The available buffer slots (or separate buffers) at any time are indicated in FIG. 6 as respective buffer counts 67 below the time lime 66. When a frame is queued for transmission the buffer count is decreased; when successful transmission of a frame has been acknowledged, the buffer count is increased. When all buffer slots are occupied, i.e. when the buffer count of available buffer slots is zero, the generated frames are not queued, but skipped. In the example of FIG. 6, this is illustrated by frames 6 and 7 being skipped due to frames 4 and 5 not yet having being acknowledged yet. In cases of delays in the transmission of audio packets, the wireless communications device may temporarily transmit audio packets at shorter intervals so as to catch up with the periodic generation of frames. In FIG. 6, this catching up is illustrated for e.g. frames 2 and 3 which are transmitted (and acknowledged) at a shorter interval than the frame interval (this also applies to frames 4,5,8 and 9,10 in FIG. 6).

Although the above embodiments have mainly been described with reference to certain specific examples, various modifications thereof will be apparent to those skilled in art without departing from the spirit and scope of the claimed invention. For example, while the various aspects disclosed herein have mainly been described in the context of hearing aids, they may also be applicable to other types of audio rendering devices. Similarly, while the various aspects disclosed herein have mainly been described in the context of a short-range RF communication between the audio rendering devices, it will be appreciated that the communications between the audio rendering devices may use other communication technologies, such as other wireless or even wired technologies. In one example, the audio rendering devices, e.g. a pair of hearing aids, may communicate with each other via a magnetic inductive link.

At least some of the embodiments disclosed herein may be summarized as follows:

Embodiment 1: An audio rendering system; comprising a wireless communications device, a first audio rendering device and a second audio rendering device;
  wherein the wireless communications device is configured to transmit a first plurality of audio packets to the first audio rendering device and to transmit a second plurality of audio packets to the second audio rendering device, the first plurality of audio packets including frames of audio data for a first audio channel from a set of one or more audio channels and the second plurality of audio packets including frames of audio data for a second audio channel from said set of one or more audio channels;
  wherein the first audio rendering device is configured to maintain a first buffer of received frames of audio data for the first audio channel and to release, at respective first buffer release times, frames of audio data for the first audio channel from said first buffer for rendering;
  wherein the second audio rendering device is configured to maintain a second buffer of received frames of audio data for the second audio channel and to release, at respective second buffer release times, frames of audio data for the second audio channel from said second buffer for rendering;
  wherein the first audio rendering device is configured to receive one or more messages from the second audio rendering device; and
  wherein at least the first audio rendering device is configured to synchronise the first buffer release times with the second buffer release times based on the received one or more messages.

Embodiment 2: An audio rendering system according to embodiment 1; wherein the first buffer release times are regularly spaced apart by a first interval and wherein the second buffer release times are regularly spaced apart by a second interval equal to the first interval.

Embodiment 3: An audio rendering system according to any one of the preceding embodiments; wherein the wireless communications device is configured to transmit the first plurality of audio packets and the second plurality of audio packets according to a transmission schedule such that audio packets of the first plurality of audio packets are scheduled for transmission to the first audio rendering device and that each audio packet of the second plurality of audio packets is scheduled for transmission to the second audio rendering device at a delay interval after a corresponding audio packet of the first plurality of audio packets is scheduled for transmission; and wherein at least the first audio rendering device is configured to determine the delay interval based on at least one of the exchanged messages.

Embodiment 4: An audio rendering system according to embodiment 3; wherein the first audio rendering device is configured to determine first packet receipt times indicative of respective times of receipt of audio packets of the first plurality of audio packets from the wireless communications device;

determine the first buffer release times from the determined first packet receipt times and from the delay interval.

Embodiment 5: An audio rendering system according to embodiment 4; wherein the first audio rendering device is configured to release audio packets from the first buffer at the determined packet receipt times delayed by a buffer delay configured to compensate for one or more delays, including for said delay interval.

Embodiment 6: An audio rendering system according to any one of embodiments 3 through 5; wherein at least the first audio rendering device is configured to receive a message from the second audio rendering device indicative of a time of receipt, by the second audio rendering device, of a previous one of the second plurality of audio packets; and to determine the delay interval from the received message and from a time of receipt of a previous one of the first plurality of audio packets by the first audio rendering device.

Embodiment 7: An audio rendering system according to any one of the preceding embodiments; wherein, for each frame of audio data for the second audio channel, the frames of audio data for the first audio channel comprises a corresponding frame of audio data, such that the audio data in the frame for the second audio channel and audio data in the corresponding frame for the first audio channel are configured for simultaneous rendering as part of, respectively, the first audio channel and the second audio channel.

Embodiment 8: An audio rendering system according to embodiment 7; wherein each frame of audio data for the first audio channel has an associated sequence number; wherein each frame of audio data for the second audio channel has an associated sequence number, such that each frame of audio data for the first audio channel has a sequence number equal to the respective sequence number of the corresponding frame of audio data for the second audio channel.

Embodiment 9: An audio rendering system according to embodiment 8; wherein the first audio rendering device is configured to receive a message from the second audio rendering device indicative of a sequence number of a frame scheduled for release from the second frame buffer at the next buffer release time.

Embodiment 10: An audio rendering system according to embodiment 9; wherein the first audio rendering device is configured to maintain the first buffer responsive to the received message.

Embodiment 11: An audio rendering system according to embodiment 10; wherein maintaining the first buffer responsive to the received message comprises one or more of:
selecting a buffer depth of the first buffer;
discarding a frame of audio data from the first buffer;
delaying release of a frame of audio data from the first buffer;
resetting the first buffer.

Embodiment 12: An audio rendering system according to any one of embodiments 9 through 11; wherein the received message from the second audio rendering device is further indicative of an elapsed time since a receipt, by the second audio rendering device, of said frame scheduled for release from the second frame buffer at the next buffer release time.

Embodiment 13: An audio rendering system according to any one of embodiments 9 through 12; wherein the received message from the second audio rendering device is further indicative of a second buffer depth of the second buffer.

Embodiment 14: An audio rendering system according to any one of the preceding embodiments; wherein the audio data is for stereo audio output that includes a plurality of stereo audio channels.

Embodiment 15: An audio rendering system according to any one of the preceding embodiments; wherein the first and second audio rendering devices are left and right hearing instruments, respectively.

Embodiment 16: An audio rendering system according to any one of the preceding embodiments; wherein the wireless communications device is configured to transmit the first and second pluralities of audio packets via respective connection-oriented communications channels.

Embodiment 17: An audio rendering system according to any one of the preceding embodiments; wherein the wireless communications device is configured to transmit the first and second pluralities of audio packets via respective BLE communications links.

Embodiment 18: An audio rendering system according to any one of the preceding embodiments; wherein the first audio rendering device comprises a first transceiver and/or a first antenna configured to establish wireless communication with the wireless communications device and with the second audio rendering device.

Embodiment 19: An audio rendering device; comprising:
at least one wireless communications interface configured to
receive a first plurality of audio packets from a wireless communications device, the first plurality of audio packets including frames of audio data for a first audio channel from a set of one or more audio channels;
exchange messages with another audio rendering device, the other audio rendering device being configured to receive a second plurality of audio packets from said wireless communications device, the second plurality of audio packets including frames of audio data for a second audio channel from said set of one or more audio channels;
a signal processor configured to process the frames of audio data included in the first plurality of audio packets for rendering by the first audio rendering device;
wherein the at least one wireless communications interface is further configured to:
maintain a first buffer of received frames of audio data and to release, at respective first buffer release times, frames of audio data from said first buffer to the signal processor for rendering;
receive one or more messages from the other audio rendering device; and to
synchronise, based on the received one or more messages; the first buffer release times with second buffer release times at which the other audio rendering device releases frames of audio data from a second buffer of received frames of audio data maintained by the other audio rendering device.

Embodiment 20: A method, implemented by a pair of audio rendering devices, the pair comprising a first audio rendering device and a second audio rendering device, of synchronising audio content rendered by said pair of audio rendering devices; the method comprising:
receiving, by the first audio rendering device from a wireless communications device; a first plurality of audio packets, the first plurality of audio packets including frames of audio data for a first audio channel from a set of one or more audio channels;

receiving, by the second audio rendering device from the wireless communications device; a second plurality of audio packets, the second plurality of audio packets including frames of audio data for a second audio channel from said set of one or more audio channels;

maintaining, by the first audio rendering device, a first buffer of received frames of audio data and releasing frames of audio data from said first buffer for rendering at respective first buffer release times;

maintaining, by the second audio rendering device, a second buffer of received frames of audio data and releasing frames of audio data from said second buffer for rendering at respective second buffer release times;

receiving, by the first audio rendering device, one or more messages from the second audio rendering device; and synchronizing, by at least the first audio rendering device, the first buffer release times with the second buffer release times based on the received one or more messages.

The invention claimed is:

1. An audio device, comprising:
at least one wireless communication interface configured to receive a first plurality of audio packets from a wireless communication device, the first plurality of audio packets including frames of audio data for a first audio channel;
a processing unit;
a speaker; and
a first buffer configured to store the frames of the audio data;
wherein the audio device is configured to release, at respective first buffer release times, the frames of the audio data for the first audio channel from the first buffer;
wherein the audio device is configured to communicate with an other audio device; and
wherein the audio device is configured to maintain the first buffer by: selecting a buffer depth of the first buffer, discarding one of the frames of the audio data from the first buffer, delaying release of one of the frames of the audio data from the first buffer resetting the first buffer, or one or more of the foregoing.

2. The audio device according to claim 1, wherein the first buffer release times are regularly spaced apart by a first interval.

3. The audio device according to claim 1, wherein the audio device is configured to determine first packet receipt times indicative of respective times of receipt of audio packets of the first plurality of audio packets from the wireless communication device, and to determine the first buffer release times based on the determined first packet receipt times.

4. The audio device according to claim 1, wherein the audio device is configured to determine at least one of the first buffer release times based on a delay interval between a transmission of one of the first plurality of audio packets and a transmission of one of a second plurality of audio packets for the other audio device.

5. The audio device according to claim 1, wherein the audio device is configured to obtain a message, wherein the audio device is configured to maintain the first buffer responsive to the message.

6. An audio system comprising the audio device of claim 1, and the wireless communication device.

7. An audio system comprising the audio device of claim 1, and the other audio device.

8. An audio device, comprising:
at least one wireless communication interface configured to receive a first plurality of audio packets from a wireless communication device, the first plurality of audio packets including frames of audio data for a first audio channel;
a processing unit;
a speaker; and
a first buffer configured to store the frames of the audio data;
wherein the audio device is configured to release, at respective first buffer release times, the frames of the audio data for the first audio channel from the first buffer;
wherein the audio device is configured to communicate with an other audio device;
wherein the audio device is configured to determine at least one of the first buffer release times based on a delay interval between a transmission of one of the first plurality of audio packets and a transmission of one of a second plurality of audio packets for the other audio device; and
wherein the audio device is configured to release one of the frames of the audio data from the first buffer at a time that is equal to a packet receipt time for the one of the frames of the audio data in the first plurality of audio packets delayed by a buffer delay configured to compensate for the delay interval.

9. An audio device, comprising:
at least one wireless communication interface configured to receive a first plurality of audio packets from a wireless communication device, the first plurality of audio packets including frames of audio data for a first audio channel;
a processing unit;
a speaker; and
a first buffer configured to store the frames of the audio data;
wherein the audio device is configured to release, at respective first buffer release times, the frames of the audio data for the first audio channel from the first buffer;
wherein the audio device is configured to communicate with an other audio device; and
wherein the audio device is configured to obtain a message, wherein the message is indicative of a time of receipt, by the other audio device, of a previous one of a second plurality of audio packets; and
wherein the audio device is configured to determine a delay interval based on (1) the message, and (2) a time of receipt of a previous one of the first plurality of audio packets by the audio device.

10. An audio device, comprising:
at least one wireless communication interface configured to receive a first plurality of audio packets from a wireless communication device, the first plurality of audio packets including frames of audio data for a first audio channel;
a processing unit;
a speaker; and
a first buffer configured to store the frames of the audio data;

wherein the audio device is configured to release, at respective first buffer release times, the frames of the audio data for the first audio channel from the first buffer;

wherein the audio device is configured to communicate with an other audio device; and wherein the audio device is configured to obtain a message, wherein the message is indicative of a sequence number of a frame scheduled for release at the other audio device.

11. An audio device, comprising:
at least one wireless communication interface configured to receive a first plurality of audio packets from a wireless communication device, the first plurality of audio packets including frames of audio data for a first audio channel;
a processing unit;
a speaker; and
a first buffer configured to store the frames of the audio data;
wherein the audio device is configured to release, at respective first buffer release times, the frames of the audio data for the first audio channel from the first buffer;
wherein the audio device is configured to communicate with an other audio device; and
wherein the audio device is configured to obtain a message, wherein the message is indicative of an elapsed time since a receipt, by the other audio device, of a frame of audio data scheduled for release from a second buffer associated with the other audio device at a next buffer release time.

12. An audio device, comprising:
at least one wireless communication interface configured to
receive a first plurality of audio packets from a wireless communication device, the first plurality of audio packets including frames of audio data for a first audio channel:
a processing unit;
a speaker; and
a first buffer configured to store the frames of the audio data;
wherein the audio device is configured to release, at respective first buffer release times, the frames of the audio data for the first audio channel from the first buffer;
wherein the audio device is configured to communicate with an other audio device; and
wherein the audio device is configured to obtain a message, wherein the message is indicative of a buffer depth of a second buffer associated with the other audio device.

13. An audio system comprising an audio device and a wireless communication device, the audio device comprising:
at least one wireless communication interface configured to receive a first plurality of audio packets from the wireless communication device, the first plurality of audio packets including frames of audio data for a first audio channel;
a processing unit;
a speaker; and
a first buffer configured to store the frames of the audio data;
wherein the audio device is configured to release, at respective first buffer release times, the frames of the audio data for the first audio channel from the first buffer;
wherein the audio device is configured to communicate with an other audio device; and
wherein the wireless communication device is configured to transmit the first plurality of audio packets to the audio device, and to transmit a second plurality of audio packets to the other audio device according to a transmission schedule.

14. The audio system according to claim 13, wherein the wireless communication device is configured to transmit each audio packet of the second plurality of audio packets to the other audio device at a delay interval after a corresponding audio packet of the first plurality of audio packets is transmitted.

15. The audio system according to claim 14, wherein the audio device is configured to determine the delay interval based on a message received by the audio device.

16. An audio system comprising an audio device and an other audio device, the audio device comprising:
at least one wireless communication interface configured to receive a first plurality of audio packets from a wireless communication device, the first plurality of audio packets including frames of audio data for a first audio channel;
a processing unit;
a speaker; and
a first buffer configured to store the frames of the audio data;
wherein the audio device is configured to release, at respective first buffer release times, the frames of the audio data for the first audio channel from the first buffer;
wherein the audio device is configured to communicate with the other audio device; and
wherein the other audio device is configured to receive a second plurality of audio packets, the second plurality of audio packets including frames of audio data for a second audio channel.

17. The audio system according to claim 16, wherein the other audio device is configured to release, at the respective second buffer release times, the frames of audio data for the second audio channel from a second buffer for processing.

18. The audio system according to claim 16, wherein the audio device and the other audio device are configured to simultaneous render one of the frames of the audio data in the first plurality of audio packets for the first audio channel, and one of the frames of the audio data in the second plurality of audio packets for the second audio channel.

19. The audio system according to claim 16, wherein each frame of audio data in the first plurality of audio packets for the first audio channel has an associated sequence number, and wherein each frame of audio data in the second plurality of audio packets for the second audio channel has an associated sequence number.

20. The audio system according to claim 16, wherein each frame of audio data in the first plurality of audio packets has a sequence number equal to a corresponding sequence number of a corresponding one of the frames of audio data in the second plurality of audio packets.

21. An audio device; comprising:
at least one wireless communication interface configured to receive a first plurality of audio packets from a wireless communication device, the first plurality of audio packets including first frames of audio data for a first audio channel, wherein the at least one wireless communication interface is also configured to communicate with an other audio device, the other audio device being configured to receive a second plurality of audio packets from the wireless communication device, the second plurality of audio packets including second frames of audio data for a second audio channel;

a signal processor configured to process the first frames of audio data in the first plurality of audio packets;

wherein the audio device is configured to release, at respective first buffer release times, the first frames of the audio data in the first plurality of audio packets from a first buffer; and wherein the audio device is configured to obtain a message, wherein the message is indicative of a buffer depth of a second buffer associated with the other audio device.

22. The audio device according to claim 21, further comprising:

a speaker; and the first buffer, wherein the first buffer is outside the speaker, and wherein the first buffer is configured to store the first frames of the audio data.

23. The audio device according to claim 21, wherein the first buffer release times are regularly spaced apart by a first interval.

24. The audio device according to claim 21, wherein the audio device is configured to determine first packet receipt times indicative of respective times of receipt of audio packets of the first plurality of audio packets from the wireless communication device, and to determine the first buffer release times based on the determined first packet receipt times.

25. The audio device according to claim 21, wherein the audio device is configured to determine at least one of the first buffer release times based on a delay interval between a transmission of one of the first plurality of audio packets and a transmission of one of the second plurality of audio packets for the other audio device.

26. The audio device according to claim 21, wherein the audio device is configured to obtain a message, wherein the message is indicative of a sequence number of one of the second frames of audio data scheduled for release at the other audio device.

27. The audio device according to claim 21, wherein the audio device is configured to obtain a message, wherein the audio device is configured to maintain the first buffer responsive to the message.

\* \* \* \* \*